(12) United States Patent
Casselman

(10) Patent No.: US 8,977,930 B1
(45) Date of Patent: Mar. 10, 2015

(54) MEMORY ARCHITECTURE OPTIMIZED FOR RANDOM ACCESS

(75) Inventor: Steven Mark Casselman, Santa Clara, CA (US)

(73) Assignee: DRC Computer Corporation, Santa Clara, CA (US)

( * ) Notice: Subject to any disclaimer, the term of this patent is extended or adjusted under 35 U.S.C. 154(b) by 370 days.

(21) Appl. No.: 13/486,693

(22) Filed: Jun. 1, 2012

Related U.S. Application Data

(60) Provisional application No. 61/492,776, filed on Jun. 2, 2011.

(51) Int. Cl.
*G11C 29/00* (2006.01)
*G06F 12/08* (2006.01)

(52) U.S. Cl.
CPC .................... *G06F 12/0802* (2013.01)
USPC ............................. 714/768; 714/718

(58) Field of Classification Search
CPC ............... G06F 12/0802; G06F 13/28; G06F 2213/0038; G11C 7/22
USPC .................. 714/768, 746, 763, 718; 711/149, 711/E12.083, E12.015; 365/201, 230.03
See application file for complete search history.

(56) References Cited

U.S. PATENT DOCUMENTS

| | | | | |
|---|---|---|---|---|
| 5,812,472 | A * | 9/1998 | Lawrence et al. | 365/201 |
| 5,912,852 | A * | 6/1999 | Lawrence et al. | 365/201 |
| 6,182,253 | B1 * | 1/2001 | Lawrence et al. | 714/718 |
| 6,574,691 | B1 * | 6/2003 | Jirgal et al. | 710/100 |
| 7,188,282 | B2 * | 3/2007 | Walmsley | 714/718 |
| 8,019,950 | B1 * | 9/2011 | Warshofsky et al. | 711/154 |
| 8,244,933 | B1 * | 8/2012 | New | 710/33 |
| 2006/0090112 | A1 * | 4/2006 | Cochran et al. | 714/737 |
| 2011/0208900 | A1 * | 8/2011 | Schuette et al. | 711/103 |

* cited by examiner

*Primary Examiner* — Phung M Chung
(74) *Attorney, Agent, or Firm* — The Webostad Firm

(57) ABSTRACT

In an embodiment, a plurality of memory dies is coupled as a memory block. The memory block has an access width defined as a system word length divided by a burst length associated with the plurality of memory dies. The burst length is greater than one. A single word having the system word length is written or read in a write operation or a read operation, respectively, through a write burst or a read burst, respectively, for random access memory operation with a granularity of the single word.

21 Claims, 5 Drawing Sheets

MEMORY ARCHITECTURE OPTIMIZED FOR RANDOM ACCESS

CROSS-REFERENCE TO RELATED APPLICATIONS

This application claims benefit of priority to U.S. provisional patent application No. 61/492,776, filed Jun. 2, 2011, which is herein incorporated by reference in its entirety for all purposes.

FIELD

One or more embodiments generally relate to integrated circuits ("ICs") and, more particularly, to a memory architecture for random access.

BACKGROUND

Heretofore, computers used a memory architecture optimized to move large amounts of data between an external memory and an internal cache. For example, conventional Dual In-Line Memory Modules ("DIMMs") may have a data width of 64 or 72 data bits. Memory chips used in these DIMMs may have a minimum burst size of 4 or 8 words. Burst size may generally be considered as a minimum number of memory reads or writes that may be done in one operation. This combination of data width and minimum burst size generally means that each memory burst access reads or writes 32 to 72 bytes of data. This may be efficient when moving a large quantity of data between processor external memory, such as for example an external Dynamic Random Access Memory ("DRAM"), and processor internal cache memory. However, this may be very inefficient when reading or writing a few bytes of data at random locations in such external memory.

Cache memory relies on the fact that many computer programs access data from a predictable and restricted range of addresses so information can may be fetched from an external memory ahead of when it is to be used and stored temporarily in cache memory ("cache"). Generally, reading or writing data that is in cache is fast in comparison to reading or writing data that is in system DRAM. Along those lines, data to be written to external DRAM for example may be stored temporarily in cache and then written to such DRAM some time later, for example during what would otherwise be an idle time or some other more convenient time. This data handling sequence may allow a processor, such as a Central Processing Unit ("CPU"), to continue to operate at high speed, such as a CPU rated speed, without waiting and/or having to slow down for reading or writing to external DRAM.

Some algorithms, however, do not have predictable and localized memory access. Search index preparation and relational database processing are examples of algorithms that may not have predictable and localized memory access for use of cache as previously described. However, there are many more examples of algorithms that may have processes, in whole or in part, having random reads and/or writes which are not suitable for or do not derive significant performance improvement by caching information. For example, executing these types of algorithms on a conventional computer system may involve a CPU spending significant amounts of time waiting for external DRAM, and thus such computer system may generally operate slowly and inefficiently with respect to execution of such types of algorithms.

Serial memory interfaces such as Fully Buffered DIMM ("FB-DIMM") and Serial Port Memory Technology ("SPMT") address reducing the number of signals between memory and an associated memory controller. However, such serial memory interfaces may not provide significant improvement for execution of such described-above algorithms having random reads and/or writes.

Hence, it would be desirable and useful to provide a memory architecture that overcomes one or more limitations of conventional memory architectures with respect to random access, including without limitation random access involving small quantities of information.

BRIEF SUMMARY

One or more embodiments generally relate to integrated circuits ("ICs") and, more particularly, to a memory architecture for random access.

An embodiment relates generally to an apparatus. Such an embodiment includes a plurality of memory dies coupled as a memory block. The memory block has an access width defined as a system word length divided by a burst length associated with the plurality of memory dies. The burst length is greater than one. A single word having the system word length is written or read in a write operation or a read operation, respectively, through a write burst or a read burst, respectively, for random access memory operation with a granularity of the single word.

In various other embodiments of the embodiment described in the preceding paragraph, such apparatus may further include one or more of the following. The apparatus can include a plurality of memory blocks including the memory block. Each of the memory blocks can include a set of the plurality of memory dies. A plurality of memory controllers can respectively be coupled to the memory blocks. Each of the memory controllers can be configured to treat the write burst and the read burst as a respective unitary operation for writing and reading, respectively, the single word. The system word length can be equal to or greater than 16. The burst length can be the same value for both the write burst and the read burst. One or more processors can be coupled to the plurality of memory blocks via the plurality of memory controllers. One or more engines can be coupled to the plurality of memory blocks via the plurality of memory controllers. An error detection and correction block can respectively be coupled to a memory controller of the memory controllers. The plurality of memory dies can be a plurality of memory chips that can be coupled to a circuit board capable of being coupled to a mother board via a Dual In-Line Memory Module socket. The plurality of memory dies can be coupled to an interposer and packaged as a single chip which can be capable of being coupled to a circuit board. The plurality of memory blocks can be coupled to an interposer and packaged as a single chip which can be capable of being coupled to a circuit board for a Dual In-Line Memory Module socket.

Another embodiment relates generally to apparatus. In such an embodiment, a memory block has a plurality of memory dies which are coupled to receive data, control information, and address information. The memory block has an access width for writing to and reading from the plurality of memory dies. The access width is defined as a system word length divided by a burst length associated with the plurality of memory dies. The burst length is greater than one. A single word having the system word length is written or read in a write operation or a read operation, respectively, through a write burst or a read burst, respectively, for random access memory operation with a granularity of the single word. A first portion of the plurality of memory dies is coupled for writing and reading the data. A second portion of the plurality of memory dies is coupled for writing and reading error-correcting code ("ECC") information. A first portion of the ECC information for the single word is written to or read from the second portion of the plurality of memory dies responsive to a first portion of the write burst or the read burst, respectively, for the write operation or the read operation, respectively. A second portion of the ECC information for the single word is written to or read from the second portion of the plurality of memory dies responsive to a second portion of the write burst or the read burst, respectively, for the write operation or the read operation, respectively.

In various other embodiments of the embodiment described in the preceding paragraph, such apparatus may further include one or more of the following. The second portion of the plurality of memory dies can further be for writing thereto and reading therefrom user-defined information. The user-defined information can include locking information. The locking information can have the granularity of the single word. The first portion of the plurality of memory dies can include a first memory die and a second memory die. The second portion of the plurality of memory dies can include a third memory die. The first portion of the ECC information can be written to and read from a first row of a memory array of the third memory die. The second portion of the ECC information can be written to and read from a second row of the memory array of the third memory die. A memory controller can be coupled to the plurality of memory dies. The memory controller can be configured to parse the data and the ECC information for writing to the first portion of the plurality of memory dies and the second portion of the plurality of memory dies, respectively. The memory controller can further be configured to concatenate the data and the ECC information after the read operation for providing to one or more processors. The memory controller can be configured to treat the write burst and the read burst as a respective unitary operation for writing and reading, respectively, the single word. The system word length can be equal to or greater than 16. The burst length can be the same value for both the write burst and the read burst. An error detection and correction block respectively can be coupled to the memory controller.

Yet another embodiment relates generally to a method for operating a memory system. Such an embodiment includes data, control information, and address information received by a memory block having a plurality of memory dies. A single word from the data is written to the plurality of memory dies of the memory block at an access width. The memory block has the access width defined as a system word length divided by a burst length associated with the plurality of memory dies. The burst length is greater than one. The writing is for a write operation with a write burst with the burst length. The single word having the system word length can be stored in the plurality of memory dies in separate pieces among the plurality of dies for random access memory operation with a granularity of the single word.

In various other embodiments of the embodiment described in the preceding paragraph, such method may further include one or more of the following. A first portion of the single word can be written to a first portion of the plurality of memory dies. A second portion of the single word including error-correcting code ("ECC") information can be written to a second portion of the plurality of memory dies. A first portion of the ECC information for the single word can be written to the second portion of the plurality of memory dies responsive to a first portion of the write burst for the write operation. A second portion of the ECC information for the single word can be written to the second portion of the plurality of memory dies responsive to a second portion of the write burst for the write operation. The second portion of the plurality of memory dies can be further for writing thereto user-defined information. The user-defined information can include locking information. The locking information can have the granularity of the single word to lock the single word.

Still yet another embodiment relates generally to a method for operating a memory system. Such an embodiment includes control information and address information received by a memory block having a plurality of memory dies. A single word from data stored in the plurality of memory dies of the memory block is read at an access width. The data is stored in separate pieces among the plurality of dies for random access memory operation with a granularity of the single word. The memory block has the access width defined as a system word length divided by a burst length associated with the plurality of memory dies. The burst length is greater than one. The reading is for a read operation with a read burst with the burst length. The separate pieces read are concatenated to provide the single word having the system word length for random access memory operation with the granularity of the single word.

In various other embodiments of the embodiment described in the preceding paragraph, such method may further include one or more of the following. A first portion of the single word can be read from a first portion of the plurality of memory dies. A second portion of the single word including error-correcting code ("ECC") information can be read from a second portion of the plurality of memory dies. A first portion of the ECC information for the single word can be read from the second portion of the plurality of memory dies responsive to a first portion of the read burst for the read operation. A second portion of the ECC information for the single word can be read from the second portion of the plurality of memory dies responsive to a second portion of the read burst for the read operation. The second portion of the plurality of memory dies can be further for reading therefrom user-defined information. The user-defined information can include locking information. The locking information can have the granularity of the single word to lock the single word.

BRIEF DESCRIPTION OF THE DRAWING(S)

Accompanying drawing(s) show exemplary embodiment(s) in accordance with one or more embodiments; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well-known features have not been described in detail so as not to obscure the invention. For ease of illustration, the same number labels are used in different diagrams to refer to the same items; however, in alternative embodiments the items may be different. Furthermore, although particular integrated circuit parts and quantities thereof are described herein for purposes of clarity by way of example, it should be understood that the scope of the description is not limited to these particular parts and/or numerical examples as other integrated circuit parts or quantities may be used.

In an embodiment, a memory block, multiple copies of which may be disposed on a module such as a DIMM for example, may be used; however, in other embodiments different physical constructions may be used. In such an embodiment, a memory controller may be provided to operate such one or more memory blocks.

To contrast, conventional DIMMs used in computers may have 64-bit or 72-bit wide data buses and contain a single memory block. In an embodiment, memory chips are organized into several narrow memory blocks, rather than a single conventional wide memory block. While aggregate bandwidth of such smaller memory blocks is less than that of such a conventional single wide memory block, such smaller memory blocks may be accessed in parallel with each block reading or writing simultaneously at different addresses. This parallelism increases random access performance of such a memory system. Additionally, in an embodiment, to reduce cost associated with implementation and/or to facilitate widespread deployment, an existing DIMM socket and associated infrastructure may be used with such a small block memory module. Thus, for example a small block memory module and a memory controller therefor may be configured for use in a conventional DIMM socket.

Figure 1:
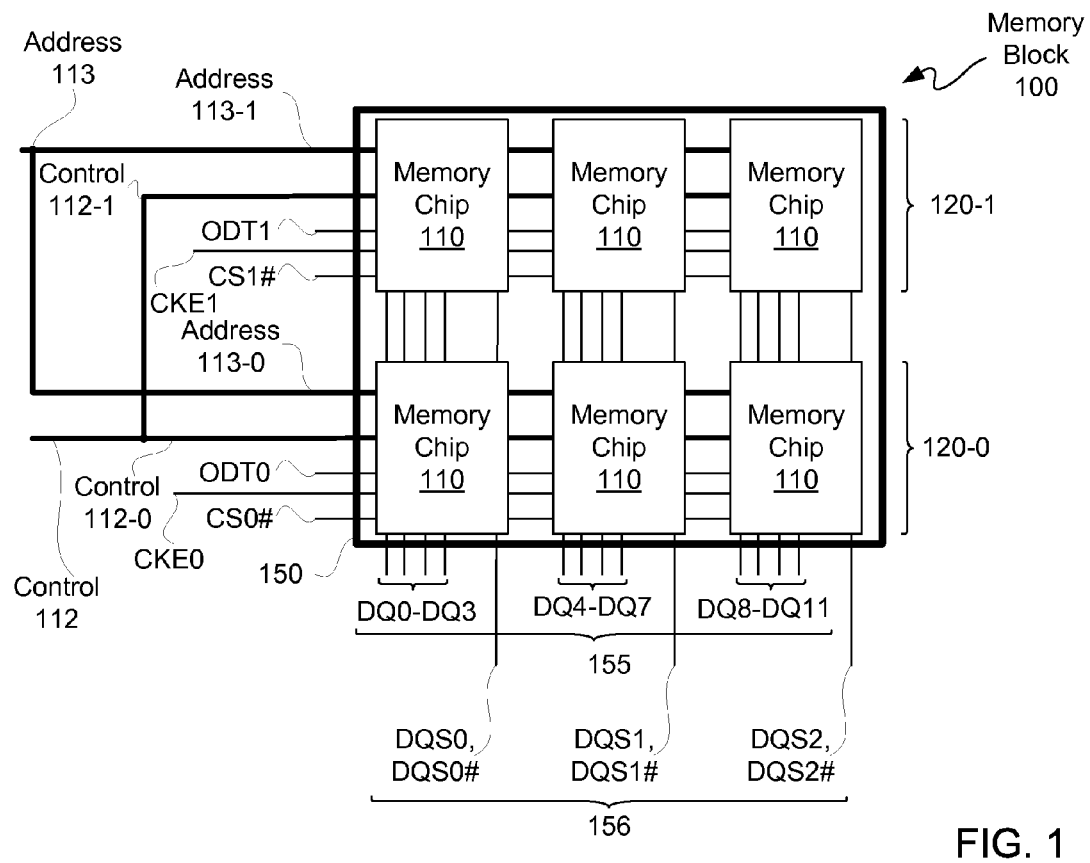
FIG. 1 is a block diagram illustratively depicting an exemplary embodiment of a memory block.

In FIG. 1, an exemplary embodiment of a memory block 100 having 6 DDR3 memory chips 110 organized in two ranks 120 of 3 chips each is illustratively depicted. In this embodiment, each memory chip 110 has 4 data input/output (DQ) lines, giving the block a 12 bit width. This contrasts to the memory block for a conventional DIMM used in computers which has a 64 or 72 bit width. The following description is applicable to any type of memory random access, even though DRAM may be used for purposes of clarity.

In this example embodiment, memory block 100 is organized in two ranks or groups 120 of 3 chips each. Although an embodiment of a memory block 100 with 12 data lines and two ranks is illustratively depicted, other embodiments may be constructed with any number of data lines or ranks, depending on the memory width and depth to be used. For example, in other embodiments, more than three DDR3 memory chips 110 in a row may be used. Furthermore, in other embodiments, block bit width may be less than or greater than 12. Thus, for purposes of clarity by way of example and not limitation, the embodiment of FIG. 1 is further described, even though other embodiments may be used.

Although DDR3 memory chips 110 are described, similar memory blocks may be constructed using DDR2 or other types of memory chips. For example, DDR3 memory has a burst length of 8-beats, namely 8 beat bursts. DDR3 memory also supports a burst chop of 4 beats. DDR2 memory for example supports 4 or 8 beat bursts. DDR1 memory for example supports 2, 4, and 8 beat burst. For purposes of clarity by way of example and not limitation, it shall be assumed that a burst length of 8 beats is used for both a read burst and a write burst for a read operation and a write operation, respectively. However, in other embodiments, other burst lengths may be used. Moreover, in other embodiments, read and write burst lengths may be different.

Referring to FIG. 1, an address signal group 113-0 and 113-1 for ranks 120-0 and 120-1, respectively, of DDR3 memory chips 110 may each include A[0:14] and BA[0:2], namely a 15-bit row and column address bus and a 3-bit bank address bus, respectively. In an embodiment, address signal group 113-0 and 113-1 are the same signals, namely address signal group 113. A control signal group 112-0 and 112-1 for ranks 120-0 and 120-1, respectively, of a DDR3 memory chips 110 may each include a row address strobe (RAS#), a column address strobe (CAS#), clock signals (CK and CK#), a data mask signal (DM), a write enable (WE#), and a reset signal (RST#). The # symbol denotes an active-low signal. In an embodiment, control signal group 112-0 and 112-1 are the same signals, namely control signal group 112. Other control signals included may be: clock enable signals (CKE[1:0]) for ranks 120-0 and 120-1, respectively, of a DDR3 memory chips 110; on die termination signals (ODT[1:0]) for ranks 120-0 and 120-1, respectively, of a DDR3 memory chips 110, chip select signals (CS[1:0]#) for ranks 120-0 and 120-1, respectively, of a DDR3 memory chips 110. Along those lines, each rank 120-0 and 120-1 may be operated separately from one another. Thus, for example if CS0# signal is low, then CS1# signal is high such that rank 120-0 is active and rank 120-1 is not active, and vice versa. Accordingly, data may be written into an active rank from data bus 155, and data may be read to data bus 155 from an active rank, where address signals 113 and control signals 112 are the same for each rank. Data bus 155 may be a multi-bit bidirectional data bus. In this example, data bus is a 12-bit bidirectional data bus having a 12-bit (DQ0:DQ11 or D0:D11) bidirectional data bus. Additionally, there are bidirectional data strobe signals (DQS0:DQS2 and DQS0#:DQS2#) 156. Thus, DQS and DQS# pair for each column of memory chips. Although these are the signals conventionally used for a DDR3 DRAM, in other embodiments, different signals may be used, which may depend on the particular memory chip or chips selected. The use of these conventional DDR3 DRAM signals is well understood by those of ordinary skill in the art of constructing conventional DIMM memory modules, and thus such signals are not described in unnecessary detail herein.

Even though the following description is in terms of DDR3 memory chips 110 coupled to a DIMM socket interface printed circuit board ("PCB") 150, namely a daughter card, in other embodiments, memory chips 110 may be memory die 110 coupled to a multi-chip module 150 or to an interposer or carrier 150 for packaging as a single IC. Furthermore, in other embodiments, memory chips 110 may be directly connected to a mother board, whether provided as memory chips 110 or memory die 110 packaged as a single IC.

Figure 2:
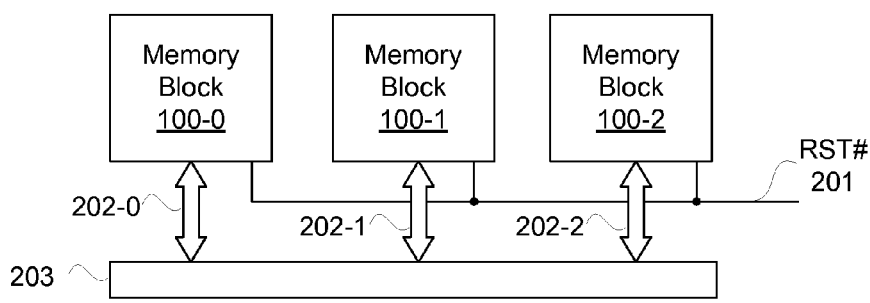
FIG. 2 is a block diagram illustratively depicting an exemplary embodiment of a memory module constructed from three of the memory blocks of FIG. 1.

In FIG. 2, an exemplary embodiment of a memory module 200, such as for a DIMM socket 203, having three of memory blocks 100-0, 100-1, and 100-3 of FIG. 1 is illustratively depicted. Each memory block 100-0, 100-1, and 100-3 has independent address, control, DQS and data signals via separate interface buses 202-0, 202-1, and 202-2, respectively, so that each memory block 100-0, 100-1, and 100-3 may operate independently of one another. Some signals, such as RST#201 for example, may be shared among memory blocks 100-0, 100-1, and 100-3 provided, however, that such shared signals are not used during normal operation. Each 12 bit memory block 100 may use 48 signal lines, so three memory blocks 100 may use 144 signal lines total. This may be compared with 126 signal lines for a single 72 bit conventional DIMM DDR3 memory block.

By making use of unused signals on a conventional DIMM interface and sacrificing a few power and ground pins, a memory module 200 may be constructed that fits into a standard DIMM socket. In this way, the expense of developing a new DIMM socket and other associated infrastructure may be avoided. For example, a microprocessor on a mother board may responsive to an Operating System ("OS") inquire as to a DIMM coupled to such board as to its configuration, and such DIMM may respond with an identification to let the microprocessor, or more particularly the OS, know what type of DIMM is being used so as to make the proper configuration settings. Along those lines, identification for a memory module 200 plugged into a DIMM socket may be provided to a microprocessor, and an OS may be configured with a driver and associated information for configuring to accommodate such a memory module 200.

Figure 3:
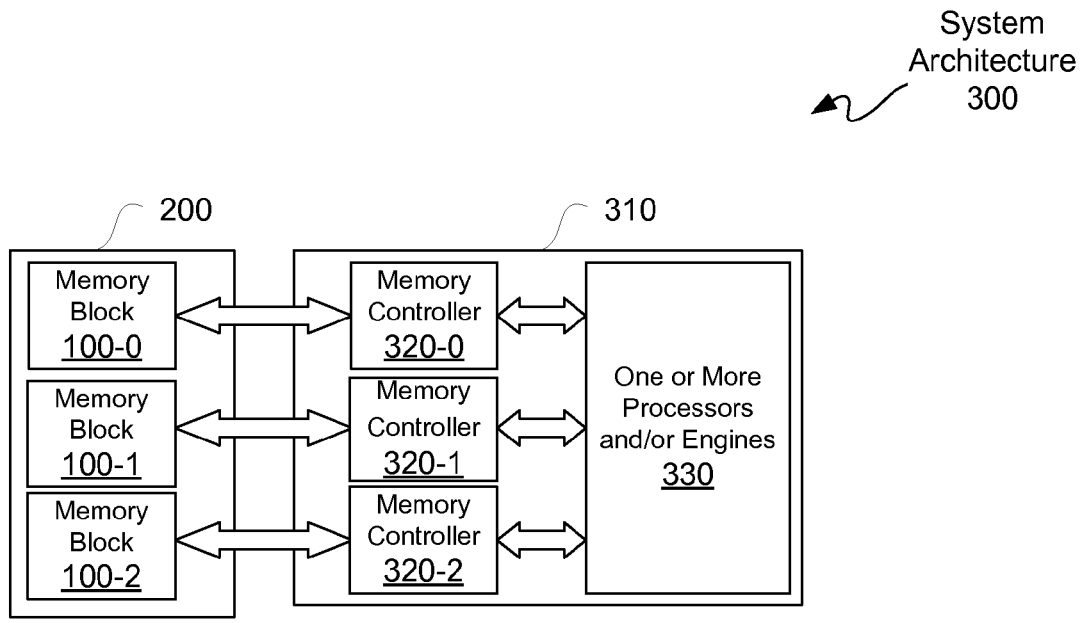
FIG. 3 is a block diagram illustratively depicting an exemplary embodiment of a system architecture using modules in accordance with FIG. 2.

In FIG. 3, an exemplary embodiment of a system architecture 300 having a memory module 200 of FIG. 2 is illustratively depicted. For purposes of clarity by way of example and not limitation, it shall continue to be assumed that memory module 200 is DIMM socket compatible, even though in other embodiments other memory module configurations may be used. With simultaneous reference to FIGS. 1-3, system architecture 300 is further described.

Memory module 200 is coupled to processing element 310. More particularly, signals to/from each of memory blocks 100-0, 100-1, and 100-3 of memory module 200 go from/to a separate memory controller 320-0, 320-1, and 320-2, respectively, of processing element 310 which is responsible for that particular memory block. Memory controllers 320-0, 320-1, and 320-2 of processing element 310 correspond to memory blocks 100-0, 100-1, and 100-3 of memory module 200 for respective interconnections. Outputs of all memory controllers 320 may be coupled to one or more processors and/or engines 330 of processing element 310 of system architecture 300. In an embodiment, processors and/or engines 330 may include one or more conventional general-purpose processors and/or one or more custom processors/engines designed to implement a specific algorithm.

Although FIG. 3 only illustratively depicts one memory module 200 having three memory blocks 100, in other embodiments of system architecture 300 multiple memory modules 200 may be use where each such memory module 200 has multiple memory blocks 100. In an embodiment, processing element 310, including memory controllers 320 and one or more processors and/or engines 330, may be implemented in one or more Field Programmable Gate Arrays ("FPGAs") or one or more Application Specific Integrated Circuits ("ASICs"), or some combination of these.

In conventional DRAM technologies, such as DDR2 and DDR3 for example, it may not be possible to access a single word of memory at a time. Instead, memory accesses may occur only in bursts, where for example 4 or 8 sequential words of memory are either read out or written in together. This improves the average throughput of such conventional memory, because address and control signals may be transferred once per burst rather than for each word of a burst. However, if memory accesses occur with random addresses, bursting sequences of words becomes inefficient. This is because an entire burst takes place, even if only one single word of memory is to be read or written. In other words, a linear sequence of 8 words may be written or read, once for each burst. This consumes additional resources, including without limitation power, and thus may not be efficient for some random access application, such as data indexing and data searching. Along those lines, multiple servers may be used in providing searching and/or indexing of "Big Data", namely more than a terabyte of data, and many search and/or indexing operations may be performed. These servers may consume significant amounts of power, and thus by making each search operation and/or indexing operation more efficient, significant power savings may be obtained.

To recapitulate, a "small" memory block operates like a "large" memory block, for example both may perform 8 word bursts. However, a small memory block has a 12-bit word and a large memory block has a 64-bit or 72-bit word. Because a small memory block consumes fewer pins, for example on a DIMM and an FPGA or ASIC, more pins are available which may be used for one or more additional memory blocks, namely more pins may be used without exceeding pin limitations. Having a smaller word provides better random-access behavior, assuming the number of pins available is a constraint. However, bandwidth may be higher, for a large memory block, because more of the pins are used for DQ (data) signals as a percentage of overall pins, namely relative to address/control signals. Memory blocks 100 still operate in bursts, but a smaller quantity of data is transferred with each burst. By small quantity of data, it is generally meant a single word is read from or written to a memory block 100. However, for a memory module 200, a small quantity of data may be as little as a single word but may go up to an 8 word burst depending on the number of memory blocks 100 in a memory module 200.

Figure 4:
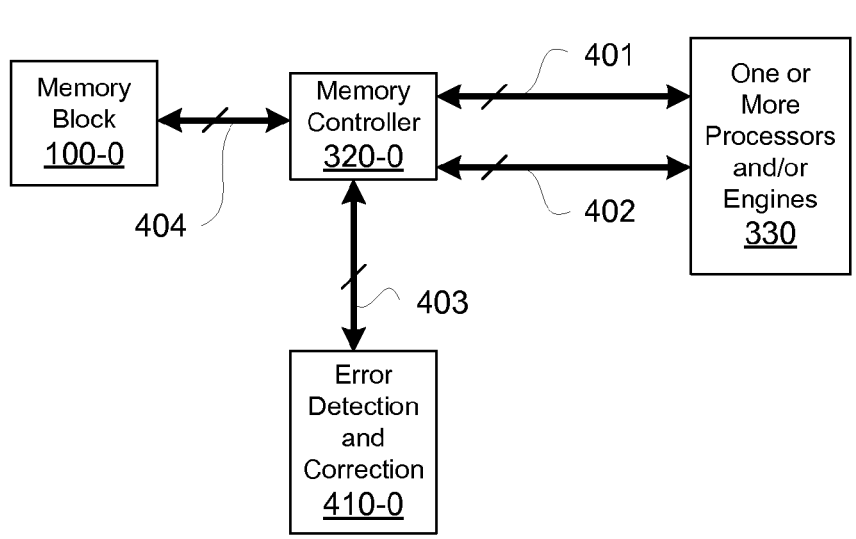
FIG. 4 is a block diagram illustratively depicting an exemplary embodiment of interfacing for the system architecture of FIG. 3.

In FIG. 4, an exemplary embodiment of interfacing for system architecture 300 of FIG. 3 is illustratively depicted. In FIG. 4, interfaces between a memory controller 320-0 and memory block 100-0 and between memory controller 320-0 and one or more processors and/or engines 330 is shown in more detail than in FIG. 3. With simultaneous reference to FIGS. 1-4, the exemplary embodiment of system architecture 300 of FIG. 4 is further described.

In this exemplary embodiment, memory block 100-0 is coupled to memory controller 320-0 via a 12-bit data bus 404, as previously described herein. An optional error detection and correction block 410-0 may be coupled to memory controller 320 via an 8-bit ECC bus 403, in this exemplary embodiment. Error detection and correction block 410-0 may be conventional, and thus it is not described in unnecessary detail herein. Furthermore, even though FIG. 4 only shows single instances of a memory block 100-0, a memory controller 320-0, and an optional error detection and correction block 410-0, it should be understood that multiple instances of these may be used in other embodiments. Thus, for example, for each memory block 100-0 and memory controller 320-0 pair, there may be an associated error detection and correction block 410-0. Error detection and correction block 410 may provide error-correcting code ("ECC") information, as described below in additional detail.

Memory controller 320-0 may combine data together for an 8 beat DDR3 burst. Each 12 bit wide memory block, such as memory block 100-0 for example, may read or write (12× 8) or 96 bits of data for each read or write burst. These 96 bits of data may be treated as a single unit by memory controller 320. In this exemplary embodiment, 64 bits are reserved for user data; 8 bits are used for error detection/correction; and the remaining 24 bits may be used for various flags, including without limitation user defined fields. While this allocation of bits is described herein, it should be understood that in other embodiments other allocations of bits may be used.

Combining data bits together for an entire burst may be used to avoid allocating error detection/correction bits for each word of a memory access, which may be unduly burdensome overhead for a narrow memory block 100-0. Memory controller 320-0 may transfer data and other information in parallel to one or more processors and/or engines 330 at ⅛ the speed such memory controller 320-0 transfers data to or from memory block 100-0. In this exemplary embodiment, bidirectional data bus 401 between memory controller 320-0 and one or more processors and/or engines 330 is a 64-bit wide bus, and bidirectional control bus 402 between memory controller 320-0 and one or more processors and/or engines 330 is a 24-bit wide bus.

Again, although FIG. 4 only shows one memory block 100-0 and one memory controller 320-0 for clarity, it should be understood that in other embodiments more than one memory block 100 and more than one memory controller 320 may be used. Furthermore, in such other embodiments, each memory block and memory controller pair may have its own interface to one or more processors and/or engines 330. Thus in other embodiments, multiple memory blocks 100 and memory controllers 320 may be used.

Figure 5:
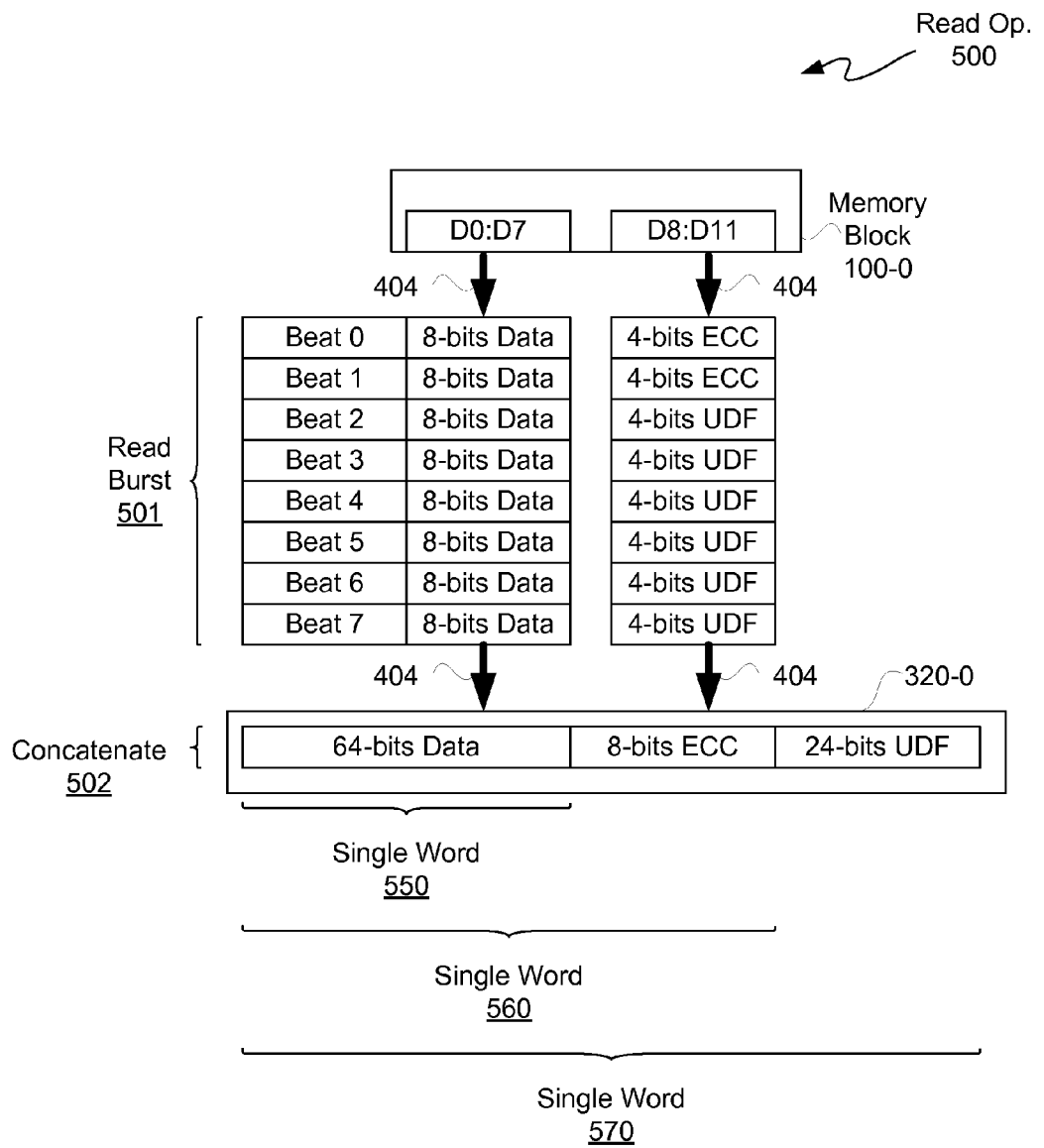
FIG. 5 is a block diagram depicting an exemplary embodiment a read operation.

FIG. 5 is a block diagram depicting an exemplary embodiment a read operation 500. For purposes of clarity by way of example not limitation, the above-described 12-bit data bus 404 and ECC bus 4034 memory block 100-0 and memory controller 320-0 are described for read operation 500.

For a burst read 501 having eight beats, namely beats 0 through 7, data from memory block 100-0 may be read out in 12 bit increments for each such beat via data bus 404. Data read out via D0 through D7 may be read from two memory chips or dies, as previously described with reference to FIG. 1, and data or other information read out via D8 through D11 may be read from another memory chip or die, as previously described with reference to FIG. 1. For 64-bit data, eight bits of ECC may be used. However, such eight bits are provided 4-bit increments on beats 0 and 1, along with 8-bit increments of data on such beats. In this exemplary embodiment, user-defined data fields ("UDFs") may have user-defined data output in 4-bit increments on beats 2 through 7 in this example. Such user-defined data may be to flag or otherwise mark data for deletion, locking, or other action. Furthermore, more than two beats of a burst may be used for ECC, and thus there may be fewer beats used for UDF data. With respect to locking, a single word may be locked at a time. This is to be contrasted to conventional data locking which is conventionally done at a page of data level. In other words, a more granular locking level may be obtained, as a single word may be locked. The above-described organization of user data bits, ECC bits and UDF bits is illustrative of one embodiment but many others are possible. For example, all the ECC bits might come together in Beat 7, or there might be more user data bits and no UDF bits. It should be understood that "data" is a generic term for any bit, such as any bit written or read from memory. However, it should be understood that "user data" are bits of data used by processor 330. In other words, ECC and UDF bits are also "data" but not "user data". Whereas a conventional memory controller may use a sufficient number of ECC bits for correcting errors independently in each beat of user data, in a small block memory new architecture, only enough ECC bits may be used to correct an error in the concatenation of user data for all 8 beats of a read burst. Since the number of ECC bits may be proportional to the log of the number of user data bits, such small memory block architecture may be more efficient. Along those lines, such small memory block architecture may be more efficient for small memory widths.

Memory controller 320-0 receives the 12 bit increments read out from read burst 501 from beat 0 to beat 7. Memory controller 320-0 treats read burst 501 as a unitary operation for reading a single word even though such a read operation 500 occurs over eight beats. Accordingly, memory controller 320-0 may be configured to concatenate 502 such 96 bits read out from burst read 501. Along those lines, 64 data bits may be concatenated along with 8 ECC bits and 24 user-defined data bits. Thus memory controller 320-0 may be configured to concatenate ECC bits obtained from two different beats as being for a single 64-bit data word, namely a single word 550. Optionally, a single word may be considered to include both data and ECC bits, such as single word 560. Furthermore, optionally, a single word may be considered to include data and ECC bits, as well as UDF bits, such as single word 570.

Figure 6:
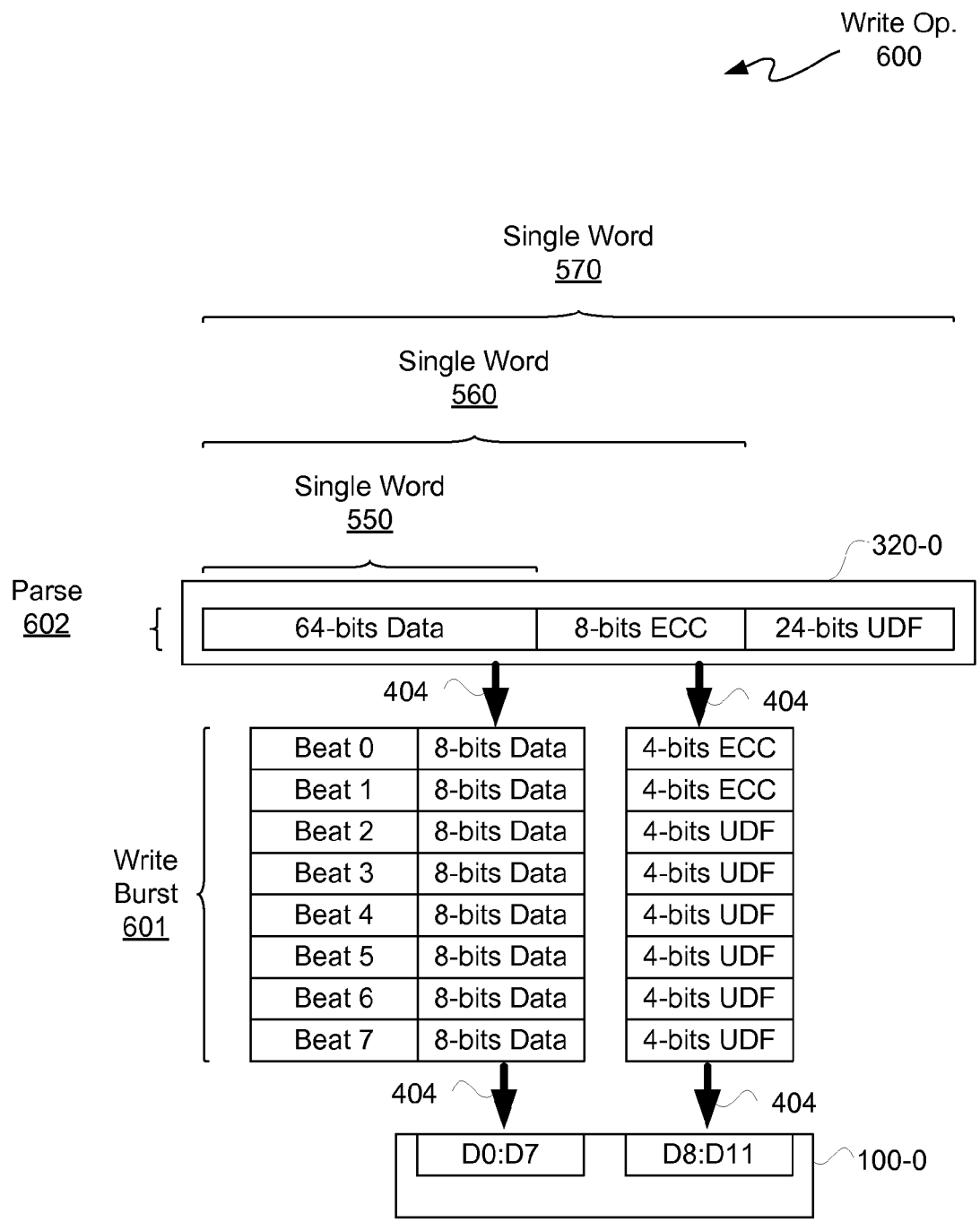
FIG. 6 is a block diagram depicting an exemplary embodiment a write operation.

FIG. 6 is a block diagram depicting an exemplary embodiment a write operation 600. For purposes of clarity by way of example not limitation, the above-described 12-bit data bus 404 and ECC bus 4034 memory block 100-0 and memory controller 320-0 are described for write operation 600.

For a burst write 601 having eight beats, namely beats 0 through 7, a single word, whether single word 550, 560, or 570, may be parsed by memory controller 320-0 for reading out in 12 bit increments for each beat to memory block 110-0 via data bus 404. For purposes of clarity by way of example not limitation, it shall be assumed that a single word 570 is used.

Again, for 64-bit data, eight bits of ECC may be used. However, such eight bits are provided 4-bit increments on beats 0 and 1, along with 8-bit increments of data on such beats. In this exemplary embodiment, UDF data is read out in 4-bit increments on beats 2 through 7 in this example, along with eight bit increments of data for such beats. Such user-defined data may be to flag or otherwise mark data for deletion, locking, or other action. Furthermore, more than two beats of a burst may be used for ECC, and thus there may be fewer beats used for UDF data. With respect to locking, a single word may be locked at a time. Again, this is to be contrasted to conventional data locking which is conventionally done at a page of data level. In other words, a more granular locking level may be obtained, as a single word may be locked for storage.

Memory block 100-0 receives the 12 bit increments read out from write burst 601 from beat 0 to beat 7 for storage. Data received via D0 through D7 may be written to two memory chips or dies, as previously described with reference to FIG. 1, and data or other information received via D8 through D11 may be written into another memory chip or die, as previously described with reference to FIG. 1. Memory block 100-0 treats write burst 601 as a unitary operation for writing a single word even though such a write operation 600 occurs over eight beats. Accordingly, memory block 100-0 may be configured to store such 96 bits written in association with one another.

Accordingly, a single word having a system word length, such as an OS system word length for example, may be written or read in a write operation or a read operation, respectively, through a write burst or a read burst, respectively, for random access memory operation with a granularity of the single word, namely individually written to or read from a memory block. A single word from input data may thus be written to a plurality of memory dies of a memory block at an access width of such memory block, where such access width is substantially narrower than a system word length. As described herein, such access width of a memory block may defined as a system word length divided by a burst length associated with the plurality of memory dies. So, for purposes of clarity by way of example and not limitation, if an OS system word length is 64 bits, and DDR3 memory dies are configured for 8 beat bursts, then access width for this example may be as 64/8 or 8 bits wide or long. Likewise, for purposes of clarity by way of example and not limitation, if a system word length is 96 bits, and DDR3 memory dies are configured for 8 beat bursts, then access width for this example may be as 96/8 or 12 bits wide or long.

Figure 7:
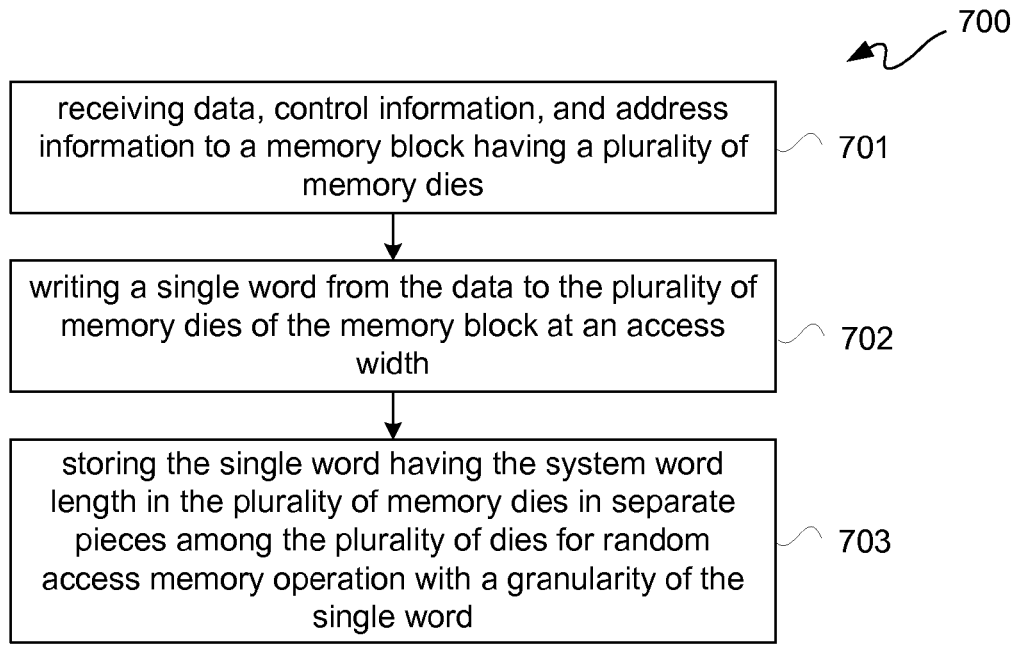
FIG. 7 is a flow diagram depicting an exemplary embodiment of a write flow for the memory block of FIG. 1.

FIG. 7 is a flow diagram depicting an exemplary embodiment of a write flow 700 for a memory block 100 of FIG. 1. At 701, data, control information, and address information is received to a memory block 100 having a plurality of memory dies 110. At 702, a single word from the data is written to memory dies 110 of memory block 100 at an access width, where memory block 100 has an access width defined as a system word length divided by a burst length associated with such memory dies 110 for a burst write operation. Burst length is greater than one, and writing is for a write operation with a write burst with the burst length as a single operation.

At 703, such a single word having such a system word length may thus be stored in memory dies 110 in separate pieces among memory dies 110 for random access memory operation with a granularity of the single word. Thus, for example with reference to FIGS. 1 and 6, 4 bits of each 8 bits of data per beat may be stored in one memory die 110, and the other 4 bits of each 8 bits of data per beat may be stored in another memory die 110.

Figure 8:
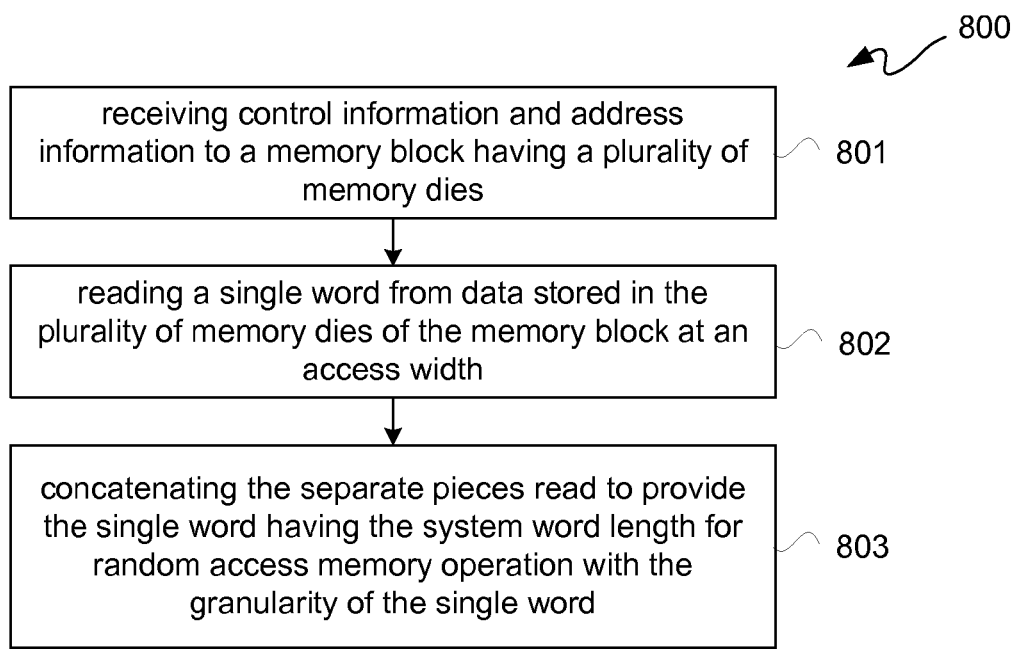
FIG. 8 is a flow diagram depicting an exemplary embodiment of a read flow for the memory block of FIG. 1.

FIG. 8 is a flow diagram depicting an exemplary embodiment of a read flow 800 for a memory block 100 of FIG. 1. At 801, control information and address information is received by a memory block 100 having memory dies 110. At 802, a single word from data stored in memory dies 110 of memory block 100 is read at an access width. Such data is stored in separate pieces among memory dies 110 for random access memory operation with a granularity of such a single word. Memory block 100 has an access width defined as a system word length divided by a burst length associated with memory dies 110 for a burst read operation. Such burst length is greater than one. Such reading is for a read operation with a read burst with such a burst length. Other details regarding access width may be the same as those previously described for write flow 700 of FIG. 7, and thus is not repeated for clarity.

At 803, such separate pieces read may be concatenated by a memory controller 320 to provide a single word having a system word length for random access memory operation with granularity of the single word. Thus, for example with reference to FIGS. 1 and 5, 4 bits of each 8 bits of data per beat may be read from one memory die 110 as one piece of a single word, and the other 4 bits of each 8 bits of data per beat may be read from another memory die 110 as another piece of such a single word. The last 4-bits may be stored in yet another memory die 110 as yet another piece of such a single word.

While the foregoing describes exemplary embodiment(s) in accordance with one or more embodiments, other and further embodiment(s) in accordance with the one or more embodiments may be devised without departing from the scope thereof, which is determined by the claim(s) that follow and equivalents thereof. Claim(s) listing steps do not imply any order of the steps. Trademarks are the property of their respective owners.

What is claimed is:

1. An apparatus, comprising:
a plurality of memory dies coupled as a memory block to commonly receive a control signal group;
wherein the memory block has an access width defined as a system word length divided by a burst length associated with the plurality of memory dies;
wherein the system word length is equal to or greater than 12 bits;
wherein the burst length is greater than a one beat burst of the system word length;
wherein the memory block is configured to have a single word having the system word length written or read in a write operation or a read operation, respectively, through a write burst or a read burst, respectively, for random access memory operation with a granularity of the single word.

2. The apparatus according to claim 1, further comprising:
a plurality of memory blocks each configured the same as the memory block;
each of the memory blocks including a set of the plurality of memory dies; and
a plurality of memory controllers respectively coupled to the memory blocks.

3. The apparatus according to claim 2, wherein:
each of the memory controllers is configured to treat the write burst and the read burst as a respective unitary operation for writing and reading, respectively, the single word; and
the burst length for each of the write burst and the read burst is the same.

4. The apparatus according to claim 2, further comprising one or more processors coupled to the plurality of memory blocks via the plurality of memory controllers.

5. The apparatus according to claim 2, comprising one or more engines coupled to the plurality of memory blocks via the plurality of memory controllers.

6. The apparatus according to claim 2, further comprising error detection and correction blocks respectively coupled to the memory controllers.

7. The apparatus according to claim 2, wherein the plurality of memory dies are a plurality of memory chips coupled to a circuit board for being coupled to a mother board via a Dual In-Line Memory Module socket.

8. The apparatus according to claim 2, wherein the plurality of memory dies are coupled to an interposer and packaged as a single chip for being coupled to a circuit board.

9. The apparatus according to claim 2, wherein the plurality of memory blocks are coupled to an interposer and packaged as a single chip for being coupled to a circuit board for a Dual In-Line Memory Module socket.

10. An apparatus, comprising:
a memory block having a plurality of memory dies coupled to receive data, control information, and address information;
wherein the memory block has an access width for writing to and reading from the plurality of memory dies;
wherein the access width is defined as a system word length divided by a burst length associated with the plurality of memory dies;
wherein the system word length is equal to or greater than 12 bits;
wherein the burst length is greater than a one beat burst of the system word length;
wherein the memory block is configured to have a single word having the system word length is written or read in a write operation or a read operation, respectively, through a write burst or a read burst, respectively, for random access memory operation with a granularity of the single word;

wherein a first portion of the plurality of memory dies is coupled for writing and reading the data;

wherein a second portion of the plurality of memory dies is coupled for writing and reading error-correcting code ("ECC") information;

wherein a first portion of the ECC information for the single word is written to or read from the second portion of the plurality of memory dies responsive to a first portion of the write burst or the read burst, respectively, for the write operation or the read operation, respectively; and wherein a second portion of the ECC information for the single word is written to or read from the second portion of the plurality of memory dies responsive to a second portion of the write burst or the read burst, respectively, for the write operation or the read operation, respectively.

11. The apparatus according to claim 10, wherein:
the second portion of the plurality of memory dies is further for writing thereto and reading therefrom user-defined information;
the user-defined information including locking information; and
the locking information having the granularity of the single word.

12. The apparatus according to claim 10, wherein:
the first portion of the plurality of memory dies includes a first memory die and a second memory die;
the second portion of the plurality of memory dies includes a third memory die;
the first portion of the ECC information is written to and read from a first row of a memory array of the third memory die; and
the second portion of the ECC information is written to and read from a second row of the memory array of the third memory die.

13. The apparatus according to claim 12, further comprising:
a memory controller coupled to the plurality of memory dies;
wherein the memory controller is configured to parse the data and the ECC information for writing to the first portion of the plurality of memory dies and the second portion of the plurality of memory dies, respectively; and
wherein the memory controller is further configured to concatenate the data and the ECC information after the read operation for providing to one or more processors.

14. The apparatus according to claim 13, wherein:
the memory controller is configured to treat the write burst and the read burst as a respective unitary operation for writing and reading, respectively, the single word; and
the burst length for each of the write burst and the read burst is the same.

15. The apparatus according to claim 13, further comprising an error detection and correction block respectively coupled to the memory controller.

16. A method for operating a memory system, comprising:
receiving data, control information, and address information by a memory block having a plurality of memory dies;
writing a single word from the data to the plurality of memory dies of the memory block at an access width;
wherein the memory block has the access width defined as a system word length divided by a burst length associated with the plurality of memory dies;
wherein the system word length is equal to or greater than 12 bits;
wherein the burst length is greater than a one beat burst of the system word length;
wherein the writing is for a write operation with a write burst with the burst length; and
storing the single word having the system word length in the plurality of memory dies in separate pieces among the plurality of dies for random access memory operation with a granularity of the single word.

17. The method according to claim 16, wherein:
a first portion of the single word is written to a first portion of the plurality of memory dies;
a second portion of the single word including error-correcting code ("ECC") information is written to a second portion of the plurality of memory dies;
a first portion of the ECC information for the single word is written to the second portion of the plurality of memory dies responsive to a first portion of the write burst for the write operation; and
a second portion of the ECC information for the single word is written to the second portion of the plurality of memory dies responsive to a second portion of the write burst for the write operation.

18. The method according to claim 17, wherein:
the second portion of the plurality of memory dies is further for writing thereto user-defined information;
the user-defined information including locking information; and
the locking information having the granularity of the single word to lock the single word.

19. A method for operating a memory system, comprising:
receiving control information and address information by a memory block having a plurality of memory dies;
reading a single word from data stored in the plurality of memory dies of the memory block at an access width;
wherein the data is stored in separate pieces among the plurality of dies for random access memory operation with a granularity of the single word;
wherein the memory block has the access width defined as a system word length divided by a burst length associated with the plurality of memory dies;
wherein the system word length is equal to or greater than 12 bits;
wherein the burst length is greater than a one beat burst of the system word length;
wherein the reading is for a read operation with a read burst with the burst length; and
concatenating the separate pieces read to provide the single word having the system word length for random access memory operation with the granularity of the single word.

20. The method according to claim 19, wherein:
a first portion of the single word is read from a first portion of the plurality of memory dies;
a second portion of the single word including error-correcting code ("ECC") information is read from a second portion of the plurality of memory dies;
a first portion of the ECC information for the single word is read from the second portion of the plurality of memory dies responsive to a first portion of the read burst for the read operation; and
a second portion of the ECC information for the single word is read from the second portion of the plurality of memory dies responsive to a second portion of the read burst for the read operation.

21. The method according to claim 20, wherein:
the second portion of the plurality of memory dies is further for reading therefrom user-defined information;
the user-defined information including locking information; and
the locking information having the granularity of the single word to lock the single word.

* * * * *